United States Patent
Nakaoda

(10) Patent No.: US 6,796,456 B2
(45) Date of Patent: Sep. 28, 2004

(54) SHEETS REGISTRATION METHOD AND APPARATUS

(75) Inventor: Toshinori Nakaoda, Aichi (JP)

(73) Assignee: Meinan Machinery Works, Inc., Obu (JP)

( * ) Notice: Subject to any disclaimer, the term of this patent is extended or adjusted under 35 U.S.C. 154(b) by 30 days.

(21) Appl. No.: 10/377,811

(22) Filed: Mar. 4, 2003

(65) Prior Publication Data

US 2003/0196739 A1 Oct. 23, 2003

(30) Foreign Application Priority Data

Mar. 6, 2002 (JP) ........................................ P2002-59611

(51) Int. Cl.$^7$ ............................................. B65G 59/00
(52) U.S. Cl. ..................................... 221/289; 271/236
(58) Field of Search .................................. 221/289, 295, 221/103, 112, 106, 180, 181, 182, 189, 236, 238; 414/794.2

(56) References Cited

U.S. PATENT DOCUMENTS 4,897,018 A * 1/1990 Nakaoda et al. ......... 414/794.2

FOREIGN PATENT DOCUMENTS

| JP | 50-078059 | 6/1975 |
|----|-----------|--------|
| JP | 53-72809  | 6/1978 |
| JP | 55-105502 | 8/1980 |
| JP | 56-086705 | 7/1981 |
| JP | 59-158201 | 9/1984 |

OTHER PUBLICATIONS

Patent Abstracts of Japan, vol. 2000, No. 25, Apr. 12, 2001, & JP 2001 232602 *Abstract*.
Patent Abstracts of Japan, vol. 2002, No. 05, May 3, 2002, & JP 2002 018805 *Abstract*.

* cited by examiner

Primary Examiner—Kenneth Noland
(74) Attorney, Agent, or Firm—Armstrong, Kratz, Quintos, Hanson & Brooks, LLP

(57) ABSTRACT

A method and apparatus of registering two sheets, such as wood veneer sheets, are disclosed. According to the method, firstly two sheets are assembled together by laying one sheet on top of the other sheet in an overlapped relation to each other wherein one end of the upper sheet is positioned outward of one end of the lower sheet. Then, the two sheets thus assembled are moved by a conveyer in the above overlapped relation in such an orientation that the above ends are moved as the leading ends. For registration of the sheets, there is provided a stop device having a stop surface extending perpendicularly to the direction in which the sheets are moved by the conveyer. On the way of movement of the sheets, firstly the upper sheet is stopped by the stop surface with the leading end thereof aligned against the stop surface, and subsequently the lower sheet is stopped by the stop surface with the leading end thereof aligned against the same stop surface. Thus, both sheets are registered with the leading ends thereof aligned properly against the stop surface of the stop device.

23 Claims, 11 Drawing Sheets

PRIOR ART

SHEETS REGISTRATION METHOD AND APPARATUS

BACKGROUND OF THE INVENTION

1. Field of the Invention

The present invention relates to a method of registering two sheets, for example wood veneer sheets, at one ends thereof by aligning the ends against a registration stop surface, and also to an apparatus for practicing the method.

2. Description of the Related Art

Manufacturing of plywood which is made by gluing and pressing together, three or more veneer sheets, includes a process of cold pressing. In this cold pressing, a number of dried veneer sheets, including those veneer sheets which have both surfaces thereof coated with adhesive, is prepared. Veneer sheets having no adhesive and veneer sheets with adhesive coating are assembled by laying one sheet on another in a predetermined order to form a stack of such veneer sheets which is to be cold pressed. As is apparent to those skilled in the art, the assembling order varies according to the number of veneer layers in the plywood to be made. In making plywood of the simplest three-ply configuration, for example, two veneer sheets with no adhesive and one veneer sheet having adhesive coating on both surfaces are laid up in an alternate manner into a stack form for cold pressing. Informing the stack, veneer sheets should be arranged preferably with two adjoining sides thereof aligned properly so as to improve the yield rate of the resulting plywood.

Though the present invention is applicable to various kinds of sheet material, it can be used advantageously specifically in preparing sets of two registered veneer sheets at least one ends of which are aligned properly.

For better understanding of the underlying background of the present invention, reference is made firstly to FIG. 1 which shows a prior art veneer sheets registration apparatus. The apparatus includes a pair of first and second belt conveyers 1 and 5 which are disposed one above the other in a convergent relation to each other as shown in the drawing for moving first and second veneer sheets W1 and W2 forward in the respective arrow directions at the same speed so that the veneer sheets W1 and W2 meet at a position adjacent to the downstream ends of the conveyers 1 and 5. A third conveyer 9 is arranged which runs at the same speed as the first conveyer 1 and form a continuous conveying path with the first conveyer 1.

First and second sensors 3 and 7 are located in vertical alignment with each other as indicated by a phantom line adjacent to the respective downstream ends of the first and second belt conveyers 1 and 5 for detecting the arrival of the leading ends of the first and second veneer sheets W1 and W2 at positions defined by the sensors 3 and 7. The first sensor 3 is operable in response to the arrival of the leading ends of the first veneer sheet W1 to generate a signal to stop the first belt conveyer 1 and hence the movement of first veneer sheet W1. Likewise, the second sensor 7 generates a signal to stop the second belt conveyer 5 when the leading end of second veneer sheet W2 is detected by the second sensor 7. The first and second veneer sheets W1 and W2 indicated by solid lines in FIG. 1 shows a state where both sheets are stopped with the leading ends thereof positioned at the respective sensors 3 and 7.

After both veneer sheets W1 and W2 have been thus positioned, the belt conveyers 1 and 5 are restarted simultaneously thereby to move forward the veneer sheets W1 and W2 again. On their way of the movement, the veneer sheets W1 and W2 meet each other at their forward edges thereof as shown by phantom lines in FIG. 1 and then transferred to the third belt conveyer 9 in an assembled state wherein the second veneer sheet W2 is laid on top of the first veneer sheet W1 with their leading ends aligned with each other. The aligned two veneer sheets W1 and W2 are then transferred to a subsequent station (not shown) where they are laid on the top of a stack in progress as described before with reference to cold pressing of veneer sheets.

In the above-described apparatus, however, each of the belt conveyers 1 and 5 may move a slight variable distance before it is completely stopped after brake application to its belt driving motors, and also simultaneous restarting of the conveyers 1 and 5 does not necessarily occur with such an accuracy that the second veneer sheet W2 is laid on the first veneer sheet W1 with the desired alignment. Additionally, veneer sheets are usually bent or warped in various ways due to the inherent characteristics of veneer and hence they receives air resistance varying depending on the manner or extend of such bending or warping while moving on the conveyer, so that some veneer sheets may not move exactly in accordance with the movement of the belt conveyer. As a result, alignment of two veneer sheets at their leading ends may not be achieved as intended. Thus, it has been difficult to achieve the desired alignment of two veneer sheets merely by controlling the operation of the first and second belt conveyers 1 and 5 in the above prior art apparatus.

Therefore, it is an object of the present invention to provide sheets registration method and apparatus which can solve the above problems.

SUMMARY OF THE INVENTION

In order to achieve the above objects, the invention provides a method of registering two sheets each having opposite ends. According to the method, firstly the two sheets are assembled by laying one sheet on top of the other sheet in an overlapped relation to each other wherein one end of the upper sheet is positioned outward of one end of the lower sheet. Then, the two sheets thus assembled are moved along a conveying path by a conveyer in the above overlapped relation in such an orientation that the above ends are moved as the leading ends.

For registration of the sheets, there is provided registration stop means which has a stop surface extending on the way of the conveying path in perpendicular relation thereto. On the way of movement along the conveying path, firstly the upper sheet is stopped by the registration stop means with its leading end aligned against the stop surface of the registration stop means, and subsequently the lower sheet is stopped by the registration stop means, having its leading end aligned against the stop surface. Thus, both sheets are registered with the leading ends thereof aligned properly against the stop surface of the registration stop means.

Various methods may be contemplated for assembling the two sheets in the above overlapped relation. According to one preferred embodiment of the invention, one sheet may be laid on the other sheet while moving the two sheets at substantially the same speed along separate feed paths one disposed below the other and extending in a convergent relation to each other toward the conveying path of the conveyer. In such a case, movement of the first and second sheets is controlled such that the sheet coming out from the upper feed path is laid on the sheet coming out from the lower feed path in the desired overlapped relation.

In another method of assembling the sheets, two feed paths are provided one above the other and substantially in parallel to each other, and one sheet placed in the upper feed path is dropped onto another sheet placed in the lower feed path, as will be described more in detail in later part hereof.

The present invention also provides an apparatus of registering two sheets. The apparatus comprises a first conveyer for moving a first sheet along a first path and a second conveyer disposed above the first conveyer for moving a second sheet along a second path at substantially the same speed as the first sheet moved by the first conveyer. In association with the first conveyer, there is provided first sensor means disposed at a first predetermined position adjacent to the downstream end of the first conveyer as seen in the moving direction of the first sheet for detecting the arrival of the leading end of the first sheet moved by the first conveyer at the first predetermined position and generating a detection signal in response to detection of such arrival. Similarly, second sensor means is disposed at a second predetermined position adjacent to the downstream end of the second conveyer as seen in the moving direction of the second sheet for detecting the arrival of the leading end of the second sheet moved by the second conveyer at said second predetermined position and generating a detection signal in response to detection of such arrival. The apparatus further includes a third conveyer disposed so as to form a conveying path continuing from the first path. The first and second paths of the first and second conveyers are directed in a convergent relation to each other toward the third conveyer so that the second sheet coming out from the second conveyer is laid on the first sheet coming out from the first conveyer and the two sheets thus assembled are transferred onto the third conveyer. The third conveyer is operable to move the sheets at substantially the same speed as the first sheet moved by the first conveyer. Operation of the first and second conveyers is controlled according to the detection signals from the first and second sensor means such that the first and second conveyers are stopped when the arrival of the leading ends of the first and second sheets at the respective first and second predetermined positions are detected by the first and second sensor means, respectively. It is also controlled such that, after both sheets have been stopped, the first and second conveyers are restarted in such controlled timing that the second sheet is laid on the first sheet in an overlapped relation wherein the leading end of the second sheet is positioned forward of the leading end of the first sheet. The apparatus further includes registration stop means having a stop surface extending perpendicularly to the conveying path of the third conveyer and movable between the operative position thereof where the stop surface is placed so as to stop the sheets moved by the third conveyer at their leading ends, and the inoperative position thereof where the stop surface is retracted away from the conveying path of the third conveyer. While being moved by the third conveyer, firstly the upper second sheet is stopped at its leading end thereof by the stop surface and subsequently the first lower sheet is stopped at its leading end by the stop surface, whereby both sheets are registered with the leading ends thereof properly aligned against the stop surface of the registration stop means.

The third conveyer has at least one conveying belt which is made of such a material that the coefficient of friction between the conveying belt and sheet is greater than that between two sheets. By so providing the third belt conveyer, after the leading end of the second sheet has been stopped by the registration stop means, the first sheet is continued to be moved forward by the third conveyer in frictional contact with the moving belts thereof while sliding relative to the lower surface of the second sheet until its leading end is stopped by the registration stop means.

The apparatus may include third sensor means which is disposed adjacent to the stop surface of the registration stop means for detecting the arrival of the leading end of the second sheet at the stop surface and generating a detection signal in response to detection of such arrival. In such a case, operation of the third conveyer is so controlled that movement of the conveyer is stopped with a predetermined length of time delay after generation of the detection signal from the third sensor means and then to retract the registration stop means to its inoperative position, which is followed by restarting of the third conveyer. The time delay is set long enough for the leading ends of both sheets to be aligned completely against the stop surface of the registration stop means.

The apparatus of the invention should preferably include regulating means for preventing the sheets from being buckled when they are stopped by the registration stop means.

According to the present invention, it may be so arranged that the first and third conveyers are combined together to form a single conveyer for feeding the first sheet and moving the assembled two sheets toward the registration stop means.

Additionally, the second conveyer may be disposed above and substantially in parallel to the first conveyer and constructed so that it allows the second sheet thereon to be dropped off therefrom toward the first conveyer so that the second sheet is laid on the first sheet in an overlapped relation wherein the leading end of the second sheet is positioned forward of the leading end of the first sheet.

Features and advantages of the present invention will become more apparent to those skilled in the art from the following description of preferred embodiments of the the invention, which description is made with reference to the accompanying drawings, wherein:

DETAILED DESCRIPTION OF EMBODIMENTS

Figure 2:
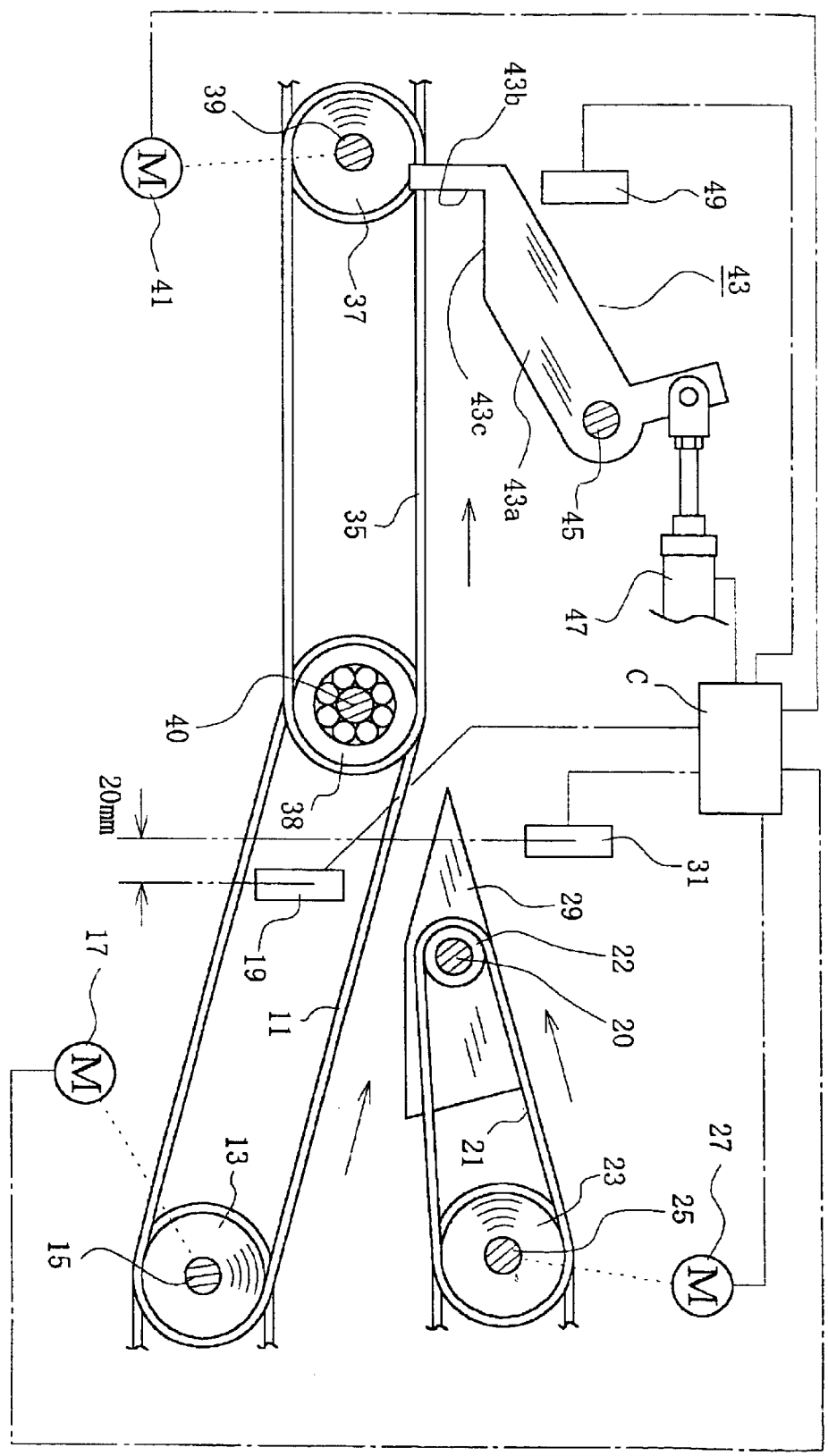
FIG. 2 is a schematic side view showing a preferred embodiment of apparatus of the present invention for registering two veneer sheets by aligning their leading ends.
Figure 3:
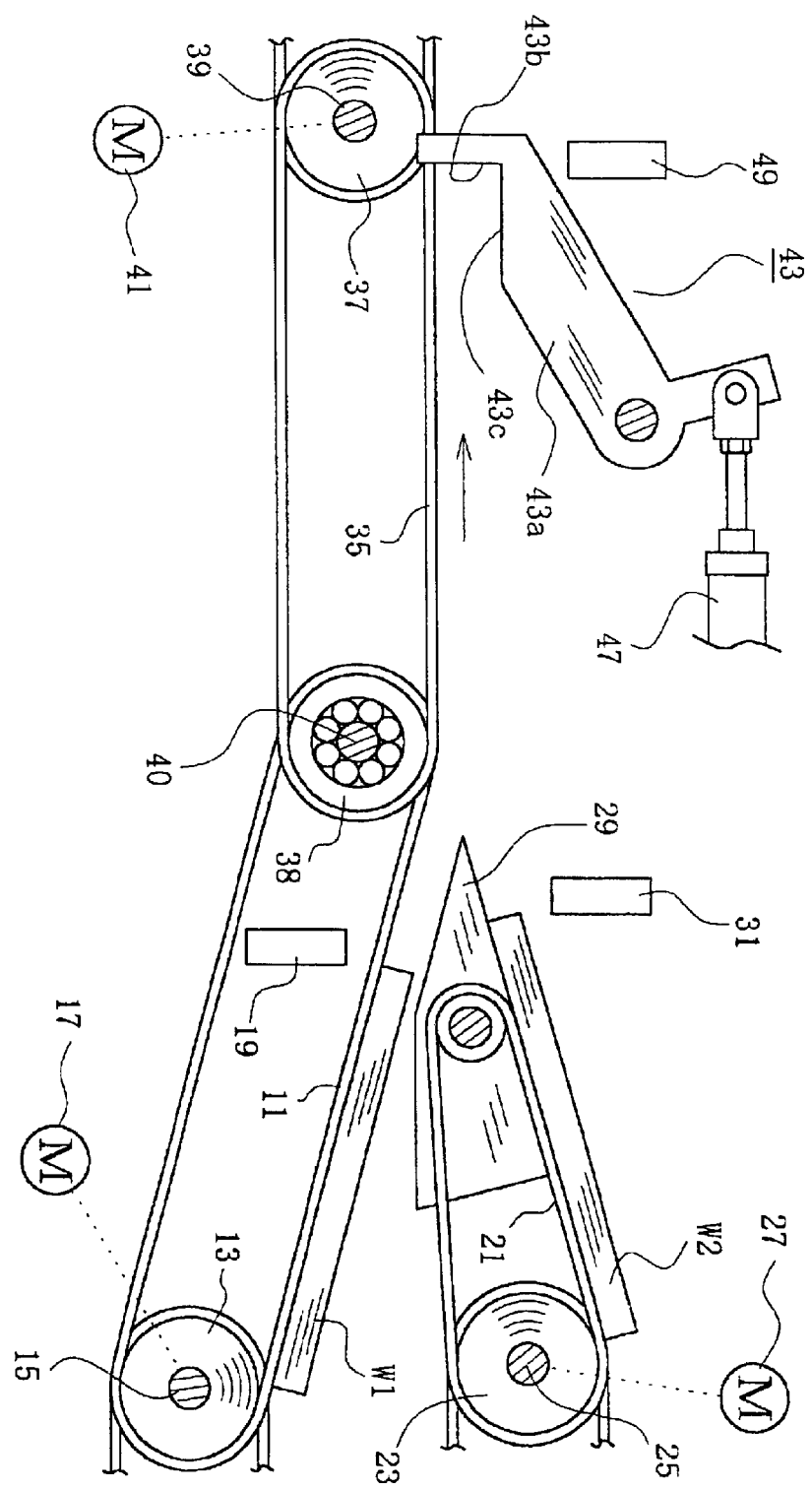
FIGS. 3 to 7 are illustrative views showing different states in operation of the apparatus of FIG. 2.

The following will describe preferred embodiments of method and apparatus of registering two sheets according to the invention with reference to the accompanying drawings;

Referring firstly to FIGS. 2 through 7, there is shown a first preferred embodiment of apparatus. The apparatus includes a pair of first and second belt feed conveyers 11 and 21 disposed one above the other and a third belt conveyer 35 extending substantially horizontally. The first feed conveyer 11 has a plurality of endless belts trained between a drive pulley 13 mounted on a shaft 15 which is in turn driven by a motor 17 and an idle pulley (not shown) freely rotatably supported on a shaft 40 for conveying a first veneer sheet W1 (shown FIG. 3) in arrow direction. Likewise, the second feed conveyer 21 has a plurality of endless belts trained between a drive pulley 23 mounted on a shaft 25 which is driven by a motor 27 and an idle pulley 22 mounted on a freely rotatable shaft 20 for conveying a second veneer sheet W2 (shown FIG. 3) in arrow direction at substantially the same speed as the first veneer sheet W1. As shown in FIG. 2, the first and second feed conveyers 11 and 21 are disposed such that the upper legs of their endless belts are directed convergently as seen in the conveying directions, so that the veneer sheets W1 and W2 are moved convergently, accordingly, as indicated by the arrows directed toward the upstream end of the third belt conveyers 35. The motors 17 and 27 for the pulleys 13 and 23 may include an induction motor or a servo motor which is operable to be controllably stopped and restarted. Reference numeral 29 designates a plurality of guide members (only one being shown) each of which is fixed to the frame of the apparatus and disposed between any two adjacent endless belts of the second feed conveyer 21. The guide members 29 extends beyond the downstream end of the feed conveyer 21 toward the upstream end of the third conveyer 35 to form an extension of the upper leg of the endless belts of the second feed conveyer 21.

Adjacent to the downstream ends of the first and second feed conveyers 11 and 21 are provided first and second sensors 19 and 31 such as photoelectric type proximity switch or mechanical limit switch for detecting the arrival of the leading ends of the first and second veneer sheets W1 and W2 moved by the feed conveyers 11 and 22, respectively. It is noted that, unlike the arrangement of sensors 3 and 7 in the prior art apparatus, the first and second sensors 19 and 31 are located one above the other with a horizontally spaced distance. To be more specific, the sensor 31 for the second veneer sheet W2 is located forward of the first sensor 19 as viewed in general moving direction of veneer sheet W1 and W2 on the first and second feed conveyers 11 and 21, respectively. In the illustrated embodiment, the horizontally spaced distance between the first and second sensors 19 and 31 is set at about 20 mm.

The third conveyer 35 has a plurality of horizontally extending endless belts trained between an idle pulley 38 freely rotatably supported on the shaft 40 and a drive pulley 37 mounted on a drive shaft 39 which is in turn connected to a motor 41 such as induction motor or a servo motor for moving two veneer sheets W1 and W2 (FIG. 5) in arrow direction at substantially the same speed as the first veneer sheet W1 moved by the first feed conveyer 11. As apparent from the drawing, the downstream idle pulley (not shown) for the first feed conveyer 11 and the upstream idle pulley 38 for the third conveyer 35 are mounted on the common shaft 40, so that the upper leg of the belts of the first and third conveyers 11 and 35 form a continuous path for veneer sheets by way of the above two pulleys. Since these two pulleys are freely rotatable on the common shaft 40, the first feed conveyer 11 and the third conveyer 35 are operable to move and stop independently of each other. The endless belts of the third conveyer 35 are made of such a material that the coefficient of friction between the belt and veneer sheet is greater than that between two veneer sheets for the purpose which will be described in later part hereof.

Adjacent to the downstream end of the third conveyer 35, a pair of stop arm assemblies 43 (only one being shown in the drawing) is provided at a spaced interval across the width of the belt conveyer 35, serving as registration stop means of the present invention. Each stop arm assembly 43 includes a swingable stop arm 43a which is pivotally supported by a shaft 45 to swing reciprocally by operation of a cylinder 47 between its operative position shown in FIG. 2 and its inoperative position shown in FIG. 7. Each stop arm 43a is formed with a registration stop surface 43b which, when the stop arm 43a is swung in its operative position, provides a vertical stop surface extending in perpendicular relation to the direction in which veneer sheets W1 and W2 are moved by the third belt conveyer 35 so that the veneer sheets W1 and W2 are stopped at the leading ends thereof by the stop surface 43b. The stop arm 43a is also formed with a regulating surface 43c which extends in parallel to the upper leg of the endless belts of the third conveyer 35 when the stop arm 43a is swung in its operative position. The regulating surface 43c serves to prevent the flexible veneer sheets W1 and W1 from being buckled by the conveying force of the third conveyer 35 when the veneer sheets are stopped by the stop arm 43a. For this purpose, the regulating surface 43c is formed such that the spaced distance between that surface and the top surface of the endless belts of the third conveyer 35 in the operative position of the stop arm 43a is slightly greater than the combined thickness of two veneer sheets W1 and W2.

A pair of third sensors 49 such as photoelectric type proximity switch or mechanical limit switch is provided (only one being shown in the drawing) adjacent to the respective stop arms 43a for detecting the arrival of the leading end of veneer sheet W2 at, or contact thereof with the registration stop surfaces 43b of the stop arms 43a. For the purpose of stability in detection, the third sensors 49 are disposed at a position slightly upstream of an imaginary vertical plane passing through the registration stop surfaces 43b of the two stop arms 43a swung in the operative position thereof.

As shown schematically in FIG. 2, the apparatus further includes a control unit C to which the sensors 19, 31 and 49, the motors 17, 27 and 41 and the cylinders 47 are operatively connected so that the operation of the motors 17, 27, 41 for the respective conveyers and the cylinders 47 for the stop arms is controlled in accordance with detection signals generated by the sensors.

The following will now describe the operation of the apparatus with reference to the drawings FIGS. 2 through 7.

In initial state of the apparatus, the conveyers 11, 21 and 35 are running in arrow directions by the motors 17, 27 and 41, respectively, and the stop arms 43a are swung in their operative position, as shown in FIG. 2. In this state, veneer sheets W1 and W2 are placed by hand or by any suitable mechanical means onto the first and second feed conveyers 11 and 21 and moved forward in arrow directions on the respective conveyers until the leading ends of the veneer sheets W1 and W2 reach and are detected by the sensors 19 and 31. That is, when the sensors 19 and 31 detect the leading ends of the veneer sheets W1 and W2, they generate detection signals to the control unit C which in turn causes the motors 17 and 27 to stop. With both conveyers 11 and 21 thus stopped, the leading ends of veneer sheets W1 and W2 are spaced horizontally by a distance of about 20 mm corresponding to the spaced distance between the two sensors 19 and 31.

After an elapse of a slight length of time since the stop of both conveyers 11 and 21, the control unit C generates a command signal to restart the drive motors 17 and 27 simultaneously thereby to resume conveying of veneer sheets W1 and W2 at the same speed by the feed conveyers 11 and 21.

Figure 4:
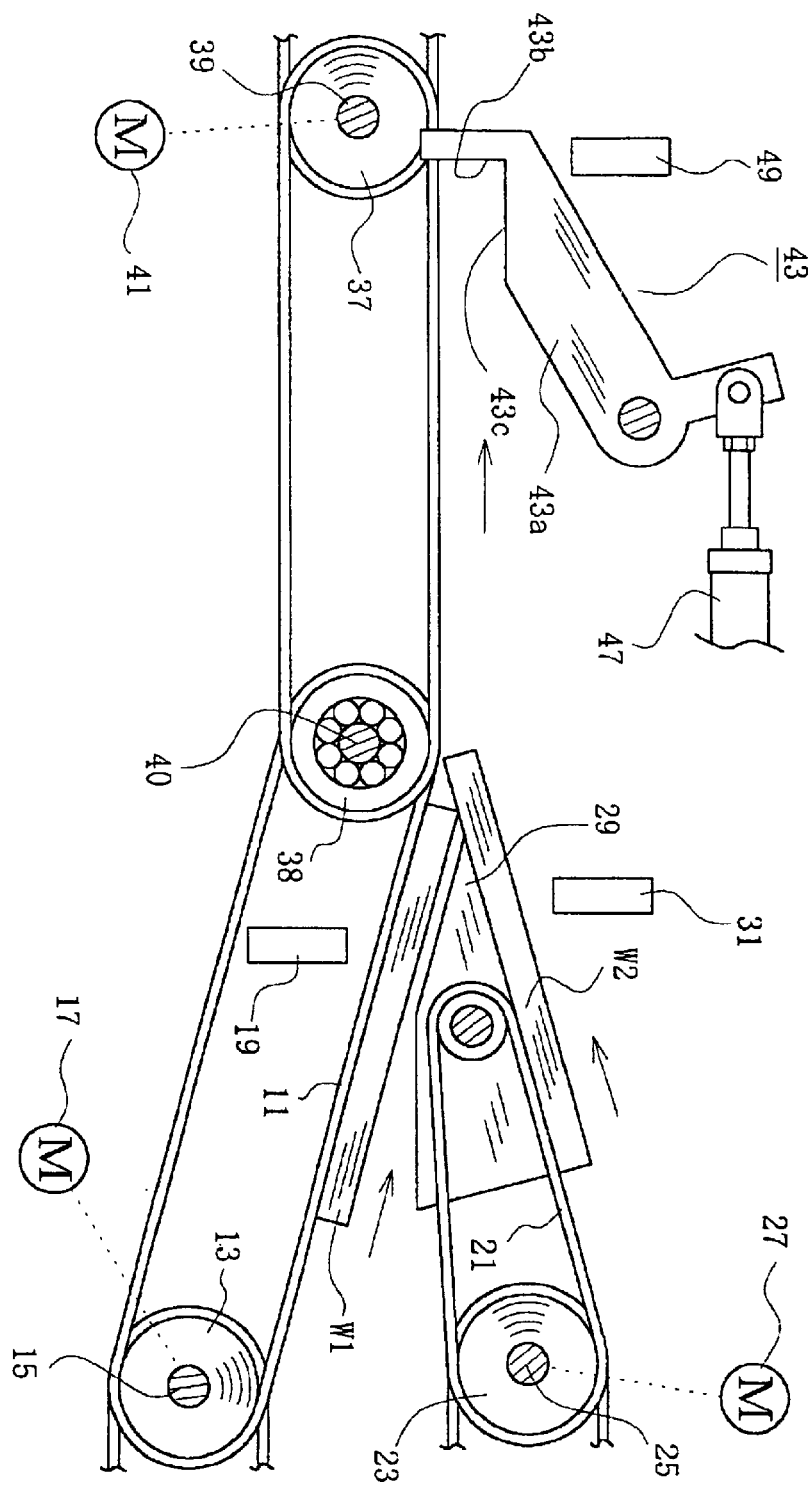

On the way of their movement, the two veneer sheets are brought into engagement between the upper edge of the leading end of veneer sheet W1 and the lower surface of veneer sheet W2 as shown in FIG. 4. With further movement of the veneer sheets, the first veneer sheet W1 is transferred onto the third belt conveyer 35 and the second veneer sheet W2 is laid on top of the first veneer sheet W1 in an overlapped or staggered relation with the leading end of the second veneer sheet W2 positioned forward of that of the first veneer sheet W1, as shown in FIG. 5, by a distance of about 20 mm corresponding to the horizontal spaced distance between the sensors 19 and 31.

Figure 5:
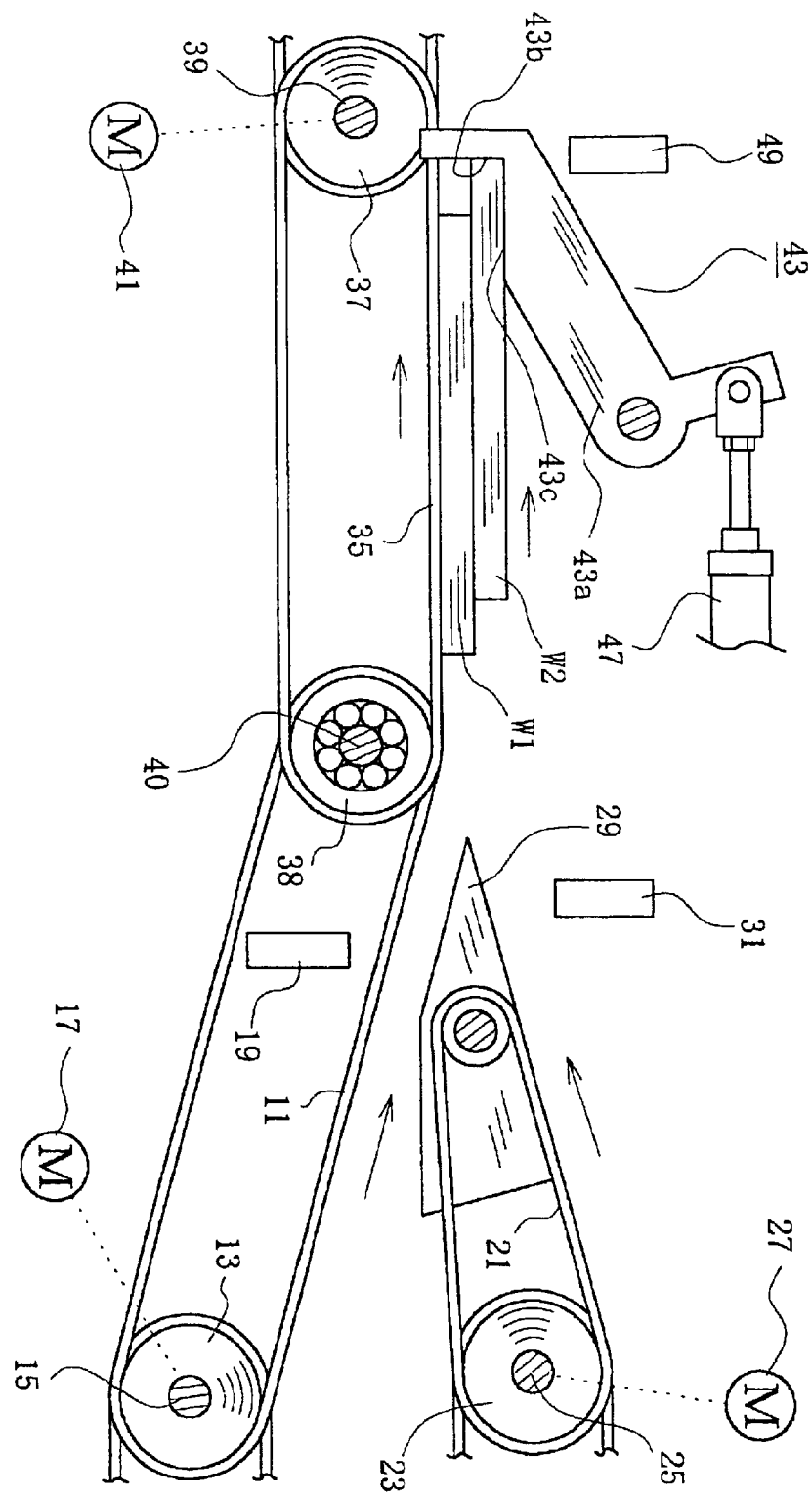
Figure 6:
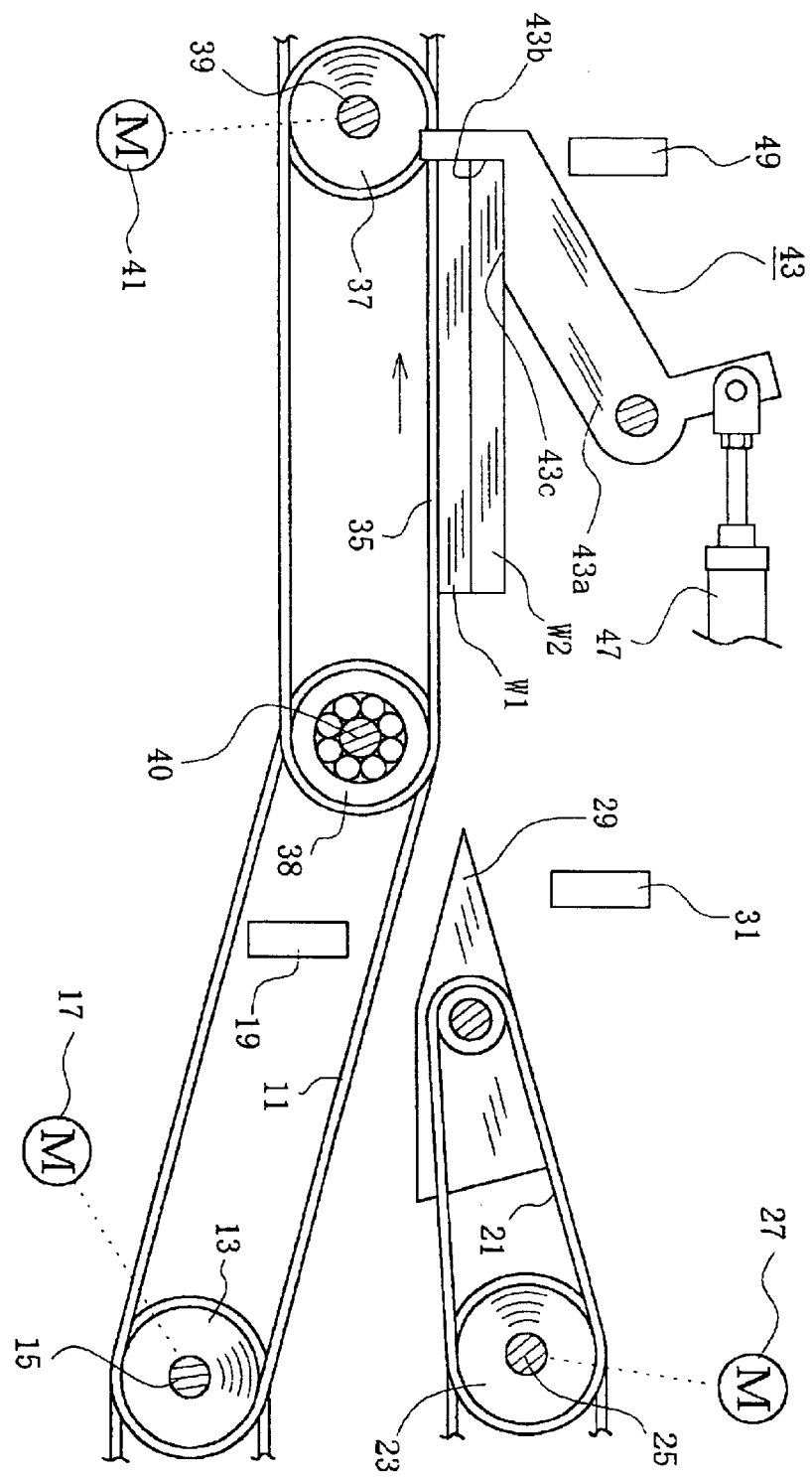

FIG. 5 also shows a state wherein the leading end of the upper veneer sheet W2 is just brought into contact with the registration stop surfaces 43b of the stop arms 43a. Detecting the arrival of the leading end of the upper veneer sheet W2, the sensor 49 generates a detection signal to the control unit C. Because the frictional coefficient between the belts of the third conveyer 35 and veneer sheet is greater than that between two veneer sheets, the lower veneer sheet W1 is continued to be moved forward by the conveyer 35 in frictional contact with the moving belts thereof while sliding relative to the lower surface of the upper veneer sheet W2 until its leading end is brought into contact with the registration stop surfaces 43b. As a result, the two veneer sheets W1 and W2 are registered with the leading ends of both veneer sheets aligned against the registration stop surfaces 43b of the stop arms 43a, as shown in FIG. 6. The provision of the regulating surfaces 43c of the stop arms helps to prevent the veneer sheets W1 and W2 from being buckled whey they are brought into contact with the registration stop surfaces 43c.

After an elapse of a predetermined length of time since the generation of the above detection signal from the sensor 49, that is long enough for the leading ends of both veneer sheets W1 and W2 to be aligned properly against the registration stop surfaces 43b, the control unit C generates a command signal to stop the motor 41, thereby stopping the third conveyer 35.

Figure 7:
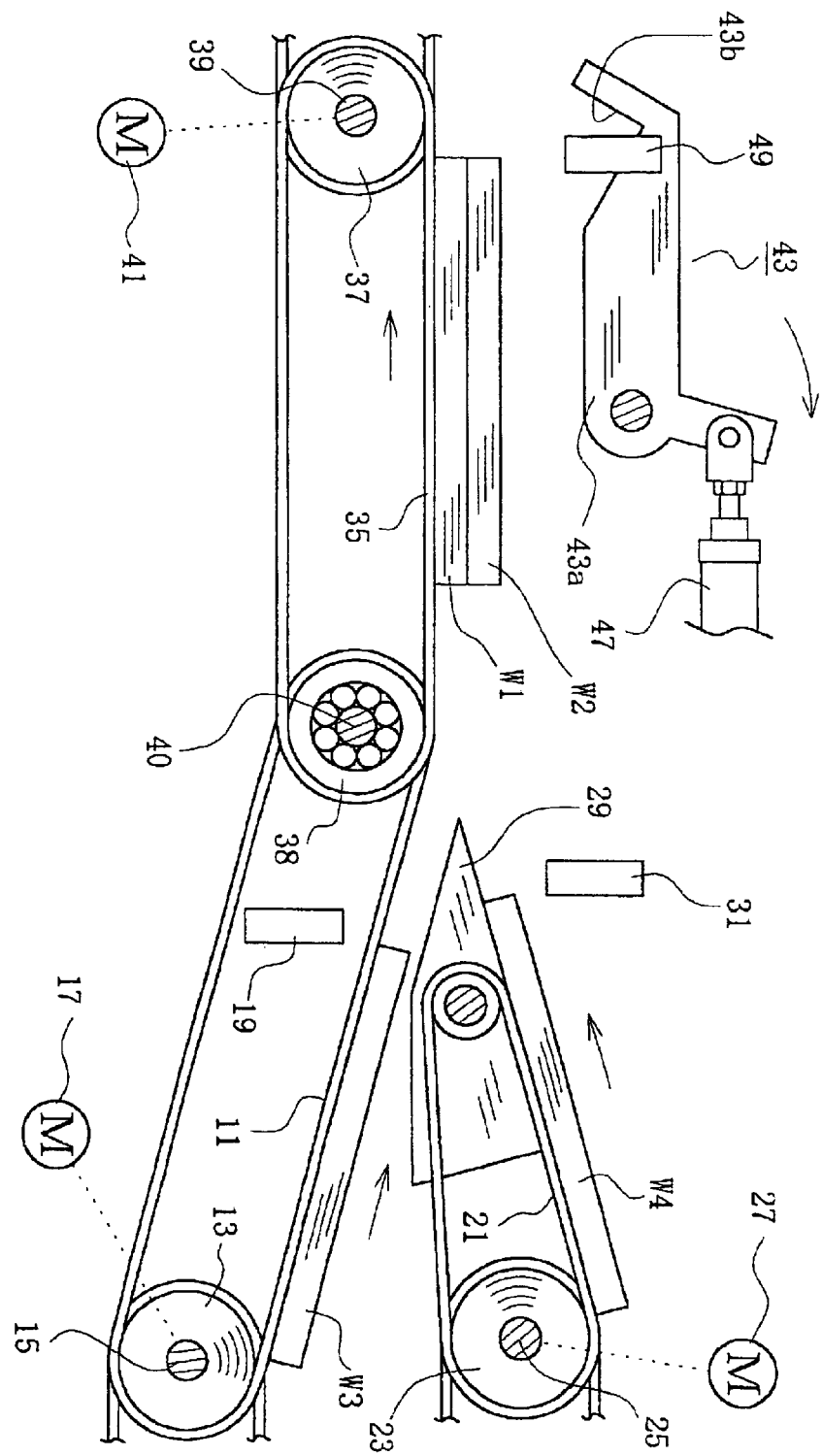

After the third conveyer 35 has been stopped, the control unit C provides a signal to actuate the cylinders 47 so as to swing the stop arms 43a to their inoperative position, as shown in FIG. 7, and subsequently another signal to restart the motor 41 thereby to activate the conveyer 35 again, so that the two registered veneer sheets W1 and W2 are delivered out from the third conveyer 35 to a subsequent station. Then, the cylinder 47 is actuated again by a signal from the control unit C to swing the stop arms 43a to their operative position shown in FIG. 2 after an elapse of a predetermined length of time that is long enough for the veneer sheets W1 and W2 to move past the conveyer 35.

For continued operation of the apparatus, new veneer sheets W3 and W4 are placed onto the first and second feed conveyers 11 and 21, respectively, the same steps of operation as described above are performed repeatedly.

In the above embodiment, the sensors 19 and 31 for detecting the arrival of veneer sheets W1 and W2 are arranged at a horizontally spaced distance of about 20 mm, so that the two veneer sheets W1 and W2 are arranged on the third conveyer 35 with the leading end of the upper veneer sheet W2 positioned forward of the leading end of the lower upper veneer sheet W1 by a distance corresponding to the above spaced distance. It is noted, however, that this value is provide only as an example. According to the results from experiment conducted by the present inventor, successful registration of veneer sheets could be achieved when the spaced distance is set between 10 mm and 40 mm.

As would be apparent to those skilled in the art, the present invention can be practiced in various other form than the above-described first preferred embodiment, as exemplified below.

Figure 8:
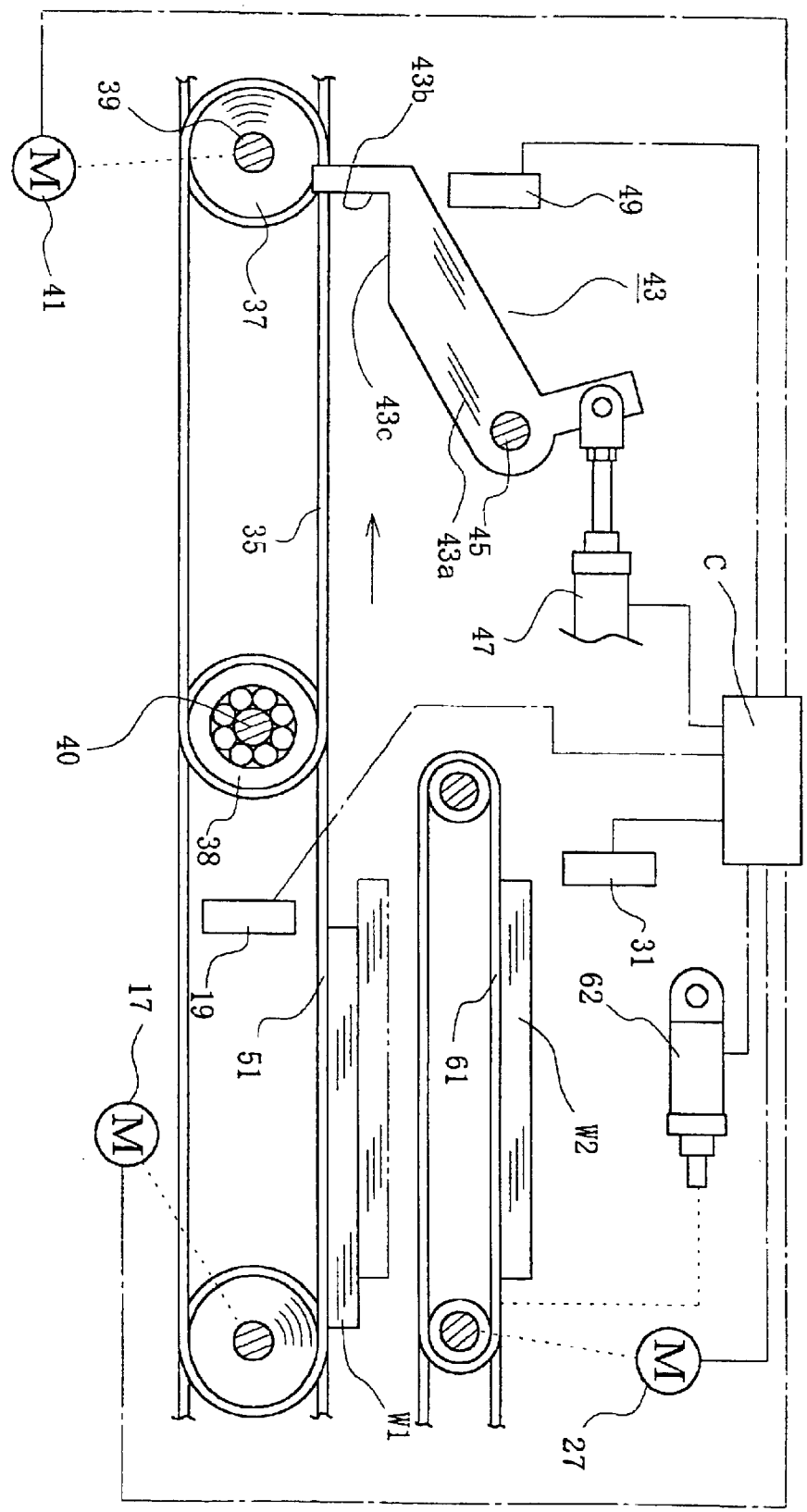
FIG. 8 is an illustrative side view showing a modified embodiment of the invention.

Referring to FIG. 8 showing a modified embodiment of the invention, this modification differs from the first preferred embodiment in that a belt conveyer 51 as the first feed conveyer is disposed in horizontal alignment with the third conveyer 35 and a belt conveyer 61 as the second feed conveyer is arranged above and in parallel relation to the first feed conveyer 51. Unlike the second feed conveyer 21 of the first preferred embodiment, the feed conveyer 61 includes two spaced endless belts which are reciprocally movable by a cylinder 62 between the normal position where a veneer sheet W2 is supported on the belts and the releasing position where the endless belts are moved away from each other so that the veneer sheet W2 on the belts is released to drop from the conveyer 61 toward the first conveyer 51. The cylinder 62 is connected to the control unit C. The sensors 19 and 31 for detecting the arrival of the leading ends of the respective veneer sheets W1 and W2 in this embodiment are arranged at a horizontally spaced distance of about 20 mm so that the veneer sheet W1 on the first conveyer 51 is stopped at a position about 20 mm behind the veneer sheet W2 on the second feed conveyer 61.

In this embodiment, the first and second feed conveyers 51 and 61 are stopped when the leading ends of veneer sheets W1 and W2 are detected by the sensors 19 and 31, as shown in FIG. 8. After both conveyers 51 and 61 have been stopped, the control unit C then responding to detection signals from the sensors 19 and 31 operates on the cylinder 62 which in turn causes the two belts of the second feed conveyer 61 to move rapidly away from each other to their releasing position so that the second veneer sheet W2 is dropped onto the veneer sheet W1 on the first feed conveyer 51. By virtue of the horizontally spaced arrangement of the first and second sensors 19 and 31, the second veneer sheet W2 is laid on top of the first veneer sheet W1 in an overlapped relation wherein the leading end of veneer sheet W2 is positioned forward of the leading end of veneer sheet W1 by a distance corresponding to the spaced distance of the sensors 19 and 31, as indicated by phantom line in FIG. 8. The veneer sheets W1 and W2 thus assembled are transferred to the third conveyer 35 and registered by the registration stop surfaces 43b of the stop arms 43a in the same manner as in the first preferred embodiment.

Figure 9:
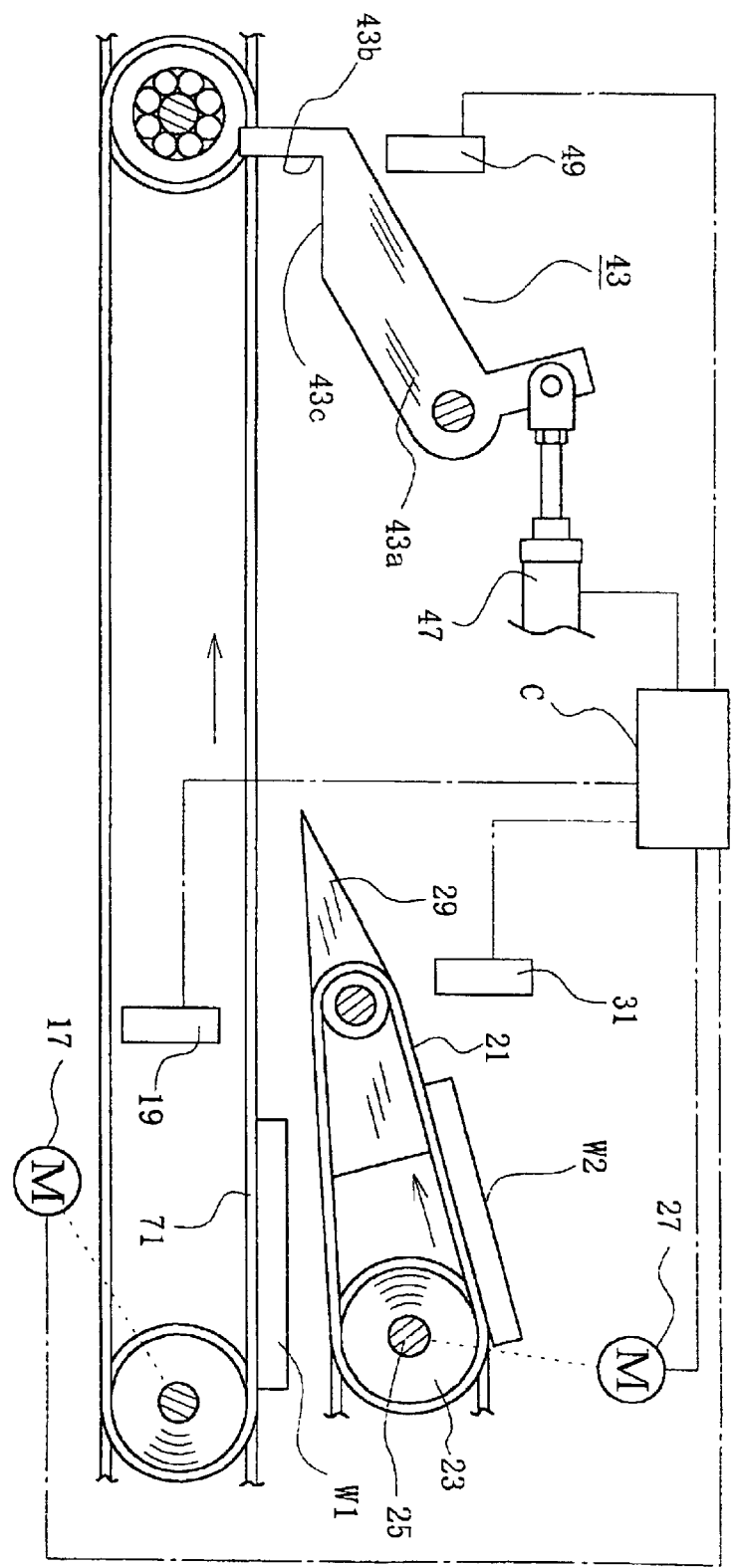
FIG. 9 is an illustrative side view showing another modified embodiment of the invention.

Referring to FIG. 9 showing still another modified embodiment of the invention, this modification differs from the embodiment shown in FIGS. 2 through 7 in that there is provided a single horizontally extending conveyer 71 in place of the first and third conveyers 11 and 35 of the first embodiment, thus dispensing with the intermediate pulleys and their related parts. The feed conveyer 21 is disposed with the upper leg of the belts thereof extending at an angle to a conveying path defined by the conveyer 71 and the downstream end of the guides 29 located at an intermediate position of the lower conveyer 71. The two conveyers 71 and 21 are driven by the motors 17 and 27 to run at substantially the same speed.

The conveyers 71 and 21 carrying veneer sheets W1 and W2 forwardly are stopped when the leading ends of veneer sheets W1 and W2 are detected by the sensors 19 and 31.

After an elapse of a slight length of time since the stop of both conveyers 71 and 21, the control unit C generates a command signal to restart the drive motors 17 and 27 simultaneously, so that the veneer sheets W1 and W2 are moved again by the conveyers 71 and 21. In the meantime, the second veneer sheet W2 is laid on top of the first veneer sheet W1 in an overlapped relation on the conveyer 71 wherein the leading end of veneer sheet W2 is positioned forward of the leading end of veneer sheet W1 by a distance corresponding to the spaced distance of the sensors 19 and 31. The veneer sheets W1 and W2 thus assembled are moved further by the conveyer 71 and registered by the registration stop surfaces 43b of the stop arms 43a in the same manner as in the above embodiments.

Figure 10:
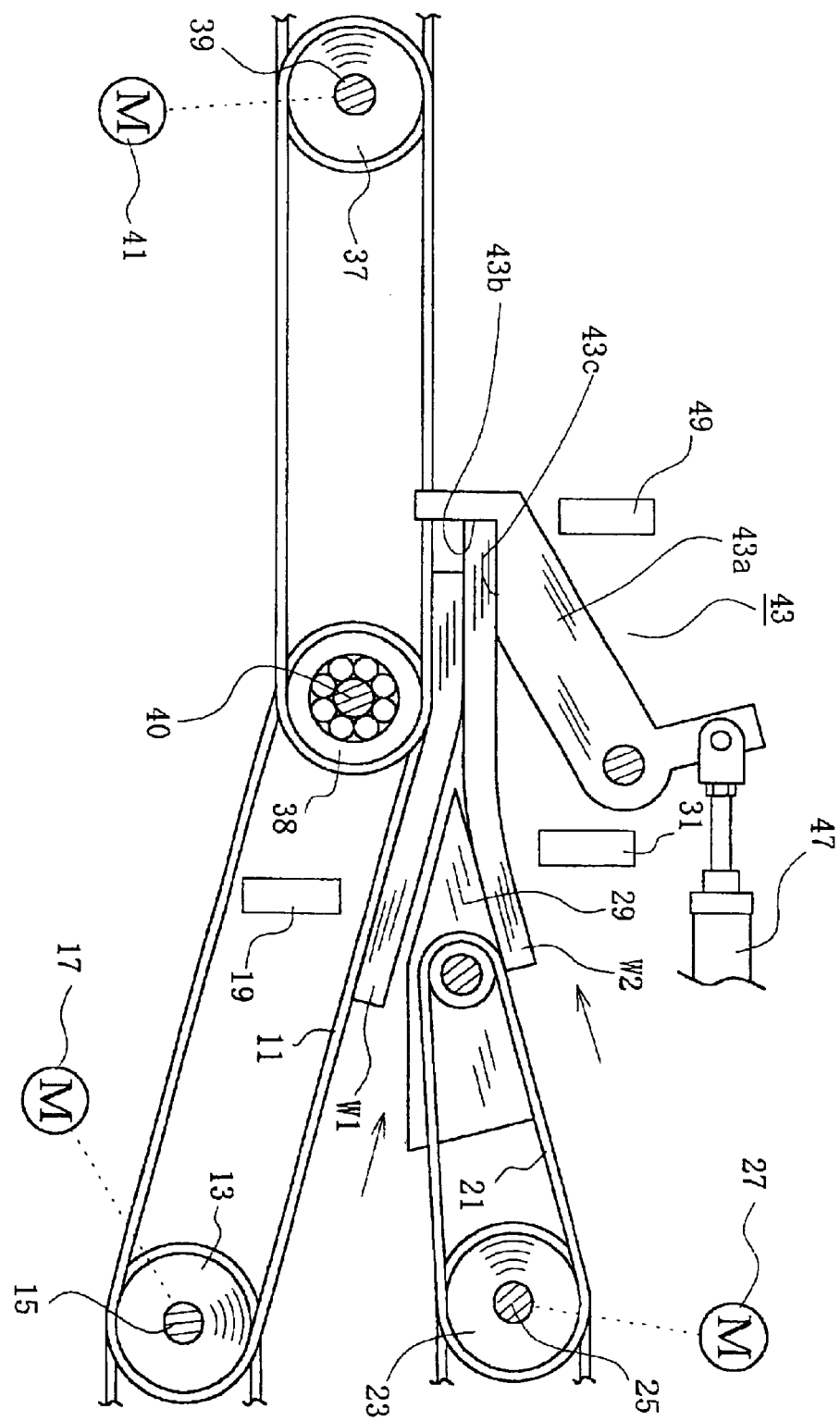
FIG. 10 is an illustrative side view showing still another modified embodiment of the invention.

For example in the embodiment of FIGS. 2 through 7 using the third conveyer 35, the registration stop arm assemblies 43 are located so far away from the intermediate pulleys that the entirety of veneer sheets W1 and W2 are transferred to and placed on the third conveyer 35 when their leading ends of the veneer sheets W1 and W2 are brought into contact with the registration stop surfaces 43b of the stop arms 43a. According to the invention, however, the stop arm assemblies 43 and the sensors 49 may be arranged closer to the intermediate pulleys, as shown in FIG. 10, so that part of the trailing end portions of veneer sheets W1 and W2 lie on the first and second feed conveyers 11 and 21, respectively, when leading end of the veneer sheets W2 has been already contacted with the registration stop surfaces 43b.

According to the present invention, the apparatus may dispense with the third sensors 49 for detecting the arrival of the leading end of veneer sheet W2 at the registration stop surface 43b of the stop arm 43a. In the case of an apparatus as shown in FIGS. 2 through 7, but dispensing with the sensors 49, the motor 41 driving the third conveyer 35 may be stopped in response to a command signal which is generated by the control unit C after an elapse of a predetermined length of time since the simultaneous restarting of the feed conveyers 11 and 21 that is long enough for the leading ends of both veneer sheets W1 and W2 to be aligned against the registration stop surfaces 43b of the stop arms 43.

Figure 1:
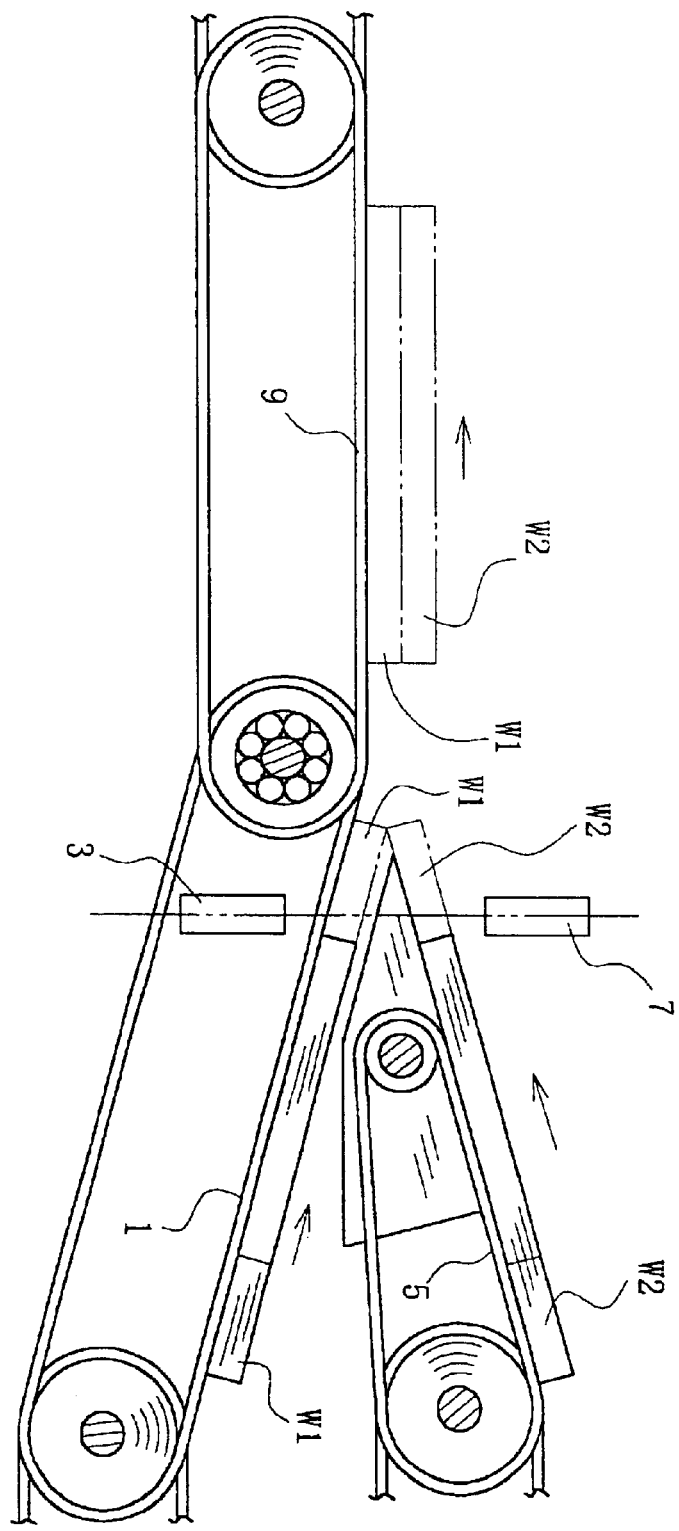
FIG. 1 is a schematic side view showing the prior art apparatus.

For example in the embodiments shown in FIGS. 2 through 7 and in FIG. 9, the sensors 19 and 31 for detecting the arrival of the leading ends of veneer sheets do not necessarily have to be located in a horizontally spaced relation, or one sensor 31 located forward of the other sensor 31, for assembling the two veneer sheets in the overlapped relation as shown by veneer sheets W1 and W2 in FIG. 5. That is, the sensors 19 and 31 may be arranged in vertical alignment with each other adjacent to the respective downstream ends of the feed conveyers 11 and 21 as in the case of the prior art apparatus of FIG. 1 so that the veneer sheets W1 and W2 are stopped on the respective conveyers 11 and 21 as indicated by solid lines in the same drawing. For laying two veneer sheets in the desired overlapped relation on the third conveyer 35, the control unit C may be operates in such a way that, after both conveyers 11 and 21 have been stopped, firstly the second feed conveyer 21 is activated and subsequently the first feed conveyer 11 is started with such a slight time delay that the desired overlapped relation of the two veneer sheets is accomplished. By so doing, the veneer sheets W1 and W2 can be registered properly by aligning their leading ends against the stop surfaces 43b of the stop arms 43a in the same manner as in the above embodiments.

Figure 11:
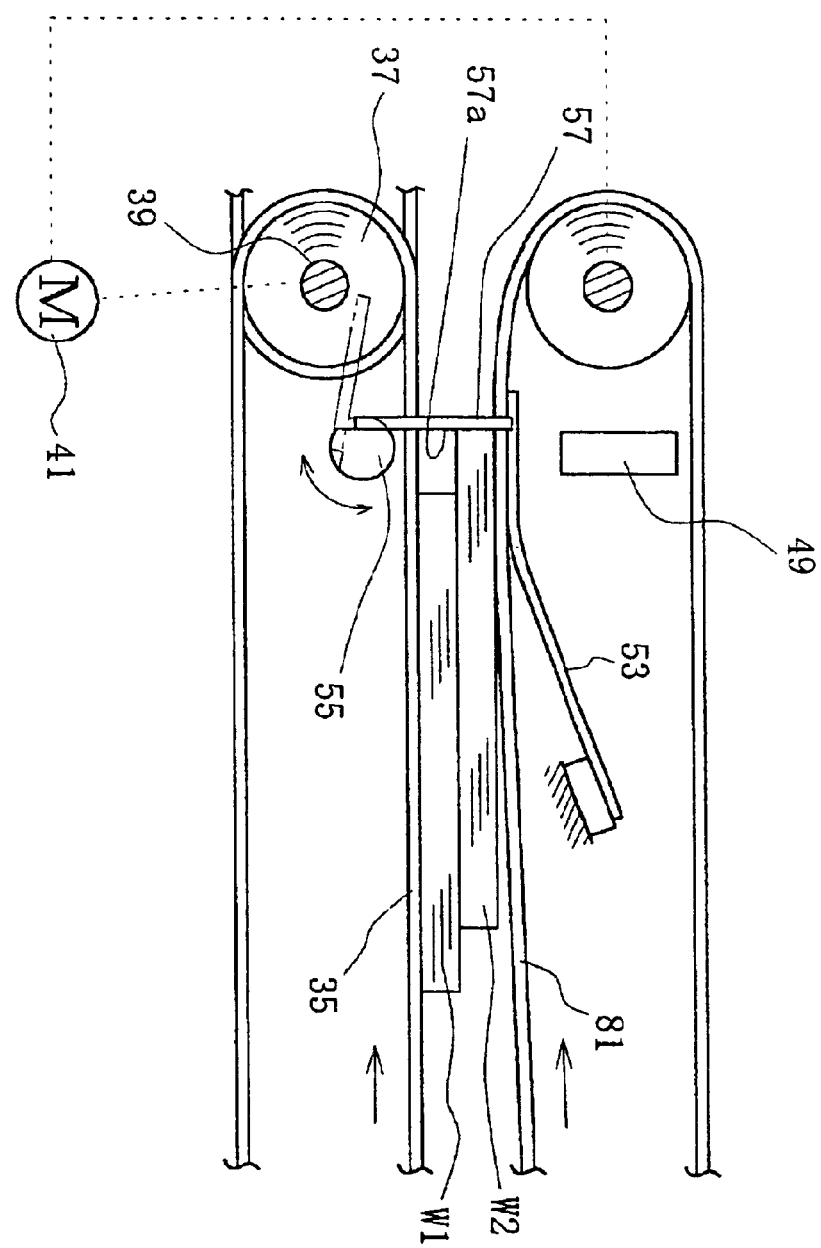
FIG. 11 is an illustrative partial side view showing still another modified embodiment of the invention.

FIG. 11 shows a modified embodiment of the registration stop means and regulating means. The registration stop means of this embodiment includes a pair of stop plates 57 (only one being shown in the drawing) each fixedly mounted to a rotatable shaft 55 and having a registration stop surface 57a so that the paired stop plates 57 are turned integrally with rotation of the shaft 55 between their operative position shown by solid line and retracted inoperative position shown by phantom line. The regulating means of this embodiment includes a plurality of regulating belts 81 (only one being shown) extending above the third conveyer 35 and driven to move in arrow direction by the common motor 41 at the same surface speed as the belts of the third conveyer 35. The belts 81 are inclined slightly in a convergent relation to the belts the third conveyer 35 as viewed in the moving direction of veneer sheets W1 and W2. Additionally, a pair of leaf springs 53 (only one being shown in the drawing) is provided, each having one end thereof fixed to the frame of the apparatus and the other end thereof pressed against the lower leg of the regulating belt 81 so that the upper veneer sheet W2 is pressed down by the leaf springs 53 by way of the belts 81. As is apparent from the drawing, registration of veneer sheets is accomplished by firstly allowing the leading end of the upper veneer sheet W2 to be aligned against the registration stop surfaces 57a of the stop plates 57 and then allowing the leading end of the other lower veneer sheet W1 to be aligned against the stop surface 57a. Bucking of veneer sheets which may occur when the sheets are stopped by the stop plates 57 can be prevented by the regulating belts 81 working in conjunction with the leaf springs 53.

Though in the above-described embodiments such as the one shown in FIGS. 2 through 7 two separate identical stop arm assemblies are provided at a spaced interval across the width of the conveyer 35 each of the stop arms 43a has its own registration stop surface 43b, it may be so arranged that the two stop arms 43a have a common registration stop surface extending across the direction in which the veneer sheets are conveyed. In such a case, there may be provided a single cylinder for actuating the two stop arms. It is also noted that the registration stop means may take various forms other those which have been described hereinbefore.

In the foregoing embodiments, the registered veneer sheets W1 and W2 are delivered out of the apparatus, moving in the same direction as they are conveyed before being stopped by the registration stop means. It may be so arranged that the registered veneer sheets may be held by any holding means and transferred thereby to any desired station. Alternatively, the third conveyer 35 may include two endless belts which are reciprocally movable by any actuating means such as cylinder between the normal position where veneer sheets are supported on the belts and the releasing position where the belts are moved rapidly away from each other so that the veneer sheets are dropped off from the conveyer 35 to any subsequent station.

What is claimed is:

1. Apparatus of registering two sheets comprising:
    a first conveyer for moving a first sheet along a first path;
    first sensor means disposed at a first predetermined position adjacent to the downstream end of said first conveyer as seen in the moving direction of the first sheet for detecting the arrival of the leading end of the first sheet moved by said first conveyer at said first predetermined position and generating a detection signal in response to detection of such arrival;
    a second conveyer disposed above said first conveyer for moving a second sheet along a second path at substantially the same speed as the first sheet moved by the first conveyer;
    second sensor means disposed at a second predetermined position adjacent to the downstream end of said second conveyer as seen in the moving direction of the second sheet for detecting the arrival of the leading end of the second sheet moved by the second conveyer at said second predetermined position and generating a detection signal in response to detection of such arrival;

a third conveyer disposed so as to form a conveying path continuing from said first path, said second path of the second conveyer being directed in a convergent manner with respect to said first path of the first conveyer so that the second sheet coming out from the second conveyer is laid on the first sheet coming out from the first conveyer and the two sheets one laid on the other are transferred onto the third conveyer, said third conveyer being operable to move the sheets at substantially the same speed as the first sheet moved by the first conveyer;

a control operable to control the operation of said first and second conveyers in response to said detection signals from the first and second sensor means so that the first and second conveyers are stopped when the arrival of the leading ends of the first and second sheets at the respective first and second predetermined positions are detected by the first and second sensor means, respectively, and also that after both sheets have been stopped the first and second conveyers are restarted in such controlled timing that the second sheet is laid on the first sheet in an overlapped relation wherein the leading end of the second sheet is positioned forward of the leading end of the first sheet; and registration stop means having a stop surface extending perpendicularly to said conveying path of the third conveyer and movable between the operative position thereof where said stop surface is placed so as to stop the sheets moved by the third conveyer at their leading ends and the inoperative position thereof where said stop surface is retracted away from said conveying path of the third conveyer, whereby firstly the second sheet is stopped at the leading end thereof by the stop surface and subsequently the first sheet is stopped at the leading end by the stop surface, thus both sheets being registered with the leading ends aligned against the stop surface of the registration stop means.

2. Apparatus of registering two sheets according to claim 1, wherein said first and second sensor means are disposed in a vertically aligned relation to each other, and said control is operable to control the operation of said first and second conveyers in response to said detection signals from the first and second sensor means in such a way that after both sheets have been stopped firstly the second conveyer is restarted to move second sheet toward said third conveyer and the first conveyer is then restarted to move the first sheet toward the third conveyer with such a predetermined time delay that the second sheet is laid on the first sheet in an overlapped relation wherein the leading end of the second sheet is positioned forward of the leading end of the first sheet by a distance corresponding to said time delay.

3. Apparatus of registering two sheets according to claim 1, wherein said first and second sensor means are arranged in a staggered relation to each other with the second sensor means located forward of the first sensor means by a predetermined horizontal spaced distance as viewed in the direction in which the sheets are moved by the third conveyer, and said control is operable to control the operation of said first and second conveyers in response to said detection signals from the first and second sensor means in such a way that after both sheets have been stopped the first and second conveyers are restarted simultaneously to move the first and second sheets toward said third conveyer so that the second sheet is laid on the first sheet in an overlapped relation wherein the leading end of the second sheet is positioned forward of the leading end of the first sheet by a distance substantially corresponding to said predetermined horizontal spaced distance.

4. Apparatus of registering two sheets according claim 2 or 3, wherein each of said first and second sensor means includes at least two sensors spaced across each of said first and second paths of the first and second conveyers.

5. Apparatus of registering two sheets according claim 1, wherein said control is operable to control the operation of said third conveyer in response to said detection signals from the first and second sensor means so as to stop the third conveyer with a predetermined length of time delay after generation of said detection signals from the first and second sensor means and then to retract the registration stop means to its inoperative position, said time delay being long enough for both sheets to be registered with their leading ends aligned completely against said stop surface of the registration stop means, and thereafter to restart said third conveyer to move the registered sheets away therefrom.

6. Apparatus of registering two sheets according claim 1, further comprising a third sensor means disposed adjacent to said stop surface of the registration stop means for detecting the arrival of the leading end of the second sheet at said stop surface and generating a detection signal in response to detection of such arrival, said control being operable to control the operation of the third conveyer in response to said detection signal from the third sensor means so as to stop the third conveyer with a predetermined length of time delay after generation of said detection signal from the third sensor means and then to retract the registration stop means to its inoperative position, said time delay being long enough for the leading ends of both sheets to be aligned completely against said stop surface of the registration stop means, and thereafter to restart said third conveyer to move the two sheets away therefrom.

7. Apparatus of registering two sheets according to claim 1, wherein said third conveyer includes at least one conveying belt which is made of such a material that the coefficient of friction between said conveying belt and the sheet is greater than that between the two sheets.

8. Apparatus of registering two sheets according to claim 1, further comprising regulating means for preventing the sheets from being buckled when they are stopped by said stop surface of the registration stop means.

9. Apparatus of registering two sheets according to claim 8, wherein said regulating means includes a surface formed on said registration stop means and extending substantially in parallel to said conveying path of the third conveyer when said registration stop means is in its operative position at a spaced distance from said conveying path of the third conveyer that is slightly greater than the combined thickness of two sheets.

10. Apparatus of registering two sheets according to claim 8, wherein said regulating means includes a belt extending above said third conveyer and moving in the same direction at substantially the same speed as the sheets moved by said third conveyer and spring means for pressing the sheets via said belt.

11. Apparatus of registering two sheets comprising:
a first conveyer on which a first sheet is placed and which is operable to move the first sheet along a first path;
first sensor means disposed at a first predetermined position on the way of said first path of the first conveyer for detecting the arrival of the leading end of the first sheet moved by the first conveyer at said first predetermined position and generating a detection signal in response to detection of such arrival;

a second conveyer disposed above said first conveyer for moving a second sheet along a second path at substantially the same speed as the first sheet moved by the first conveyer, said second path of the second conveyer being directed in a convergent manner with respect to said first path of the first conveyer so that the second sheet coming out from the second conveyer is laid on the first sheet moving on the first conveyer;

second sensor means disposed at a second predetermined position adjacent to the downstream end of the second conveyer as seen in the moving direction of the second sheet for detecting the arrival of the leading end of the second sheet moved by said second conveyer at said second predetermined position and generating a detection signal in response to detection of such arrival;

a control operable to control the operation of said first and second conveyers in response to said detection signals from the first and second sensor means so that the first and second conveyers are stopped when the arrival of the leading ends of the first and second sheets at the respective predetermined positions are detected by the first and second sensor means, respectively, and also that after both sheets have been stopped the first and second conveyers are restarted in such timing that the second sheet is laid on the first sheet in an overlapped relation wherein the leading end of the second sheet is positioned forward of the leading end of the first sheet; and registration stop means having a stop surface extending perpendicularly to said first path of the first conveyer and movable between the operative position thereof where said stop surface is placed so as to stop the sheets moved by the first conveyer at their leading ends and the inoperative position thereof where said stop surface is retracted away from said first path, whereby firstly the second sheet is stopped at the leading end thereof by the stop surface and subsequently the first sheet is stopped at the leading end by the stop surface, thus both sheets being registered with the leading ends aligned against the stop surface of the registration stop means.

12. Apparatus of registering two sheets comprising:

a first conveyer for moving a first sheet along a first path;

first sensor means disposed at a first predetermined position adjacent to the downstream end of said first conveyer as seen in the moving direction of the first sheet for detecting the arrival of the leading end of the first sheet moved by said first conveyer at said first predetermined position and generating a detection signal in response to detection of such arrival;

a second conveyer disposed above and substantially in parallel to said first conveyer for moving a second sheet along a second path, said second conveyer being operable so as to allow the second sheet thereon to be dropped off therefrom toward the first conveyer;

second sensor means disposed at a second predetermined position which is forward of said first predetermined position of the first sensor means by a predetermined horizontal spaced distance as viewed in the direction in which the first and second sheets are moved by the first and second conveyers, respectively, for detecting the arrival of the leading end of the second sheet moved by said second conveyer at said second predetermined position and generating a detection signal in response to detection of the arrival;

a control operable to control the operation of said first and second conveyers in response to said detection signals from the first and second sensor means so that the first and second conveyers are stopped when the arrival of the leading ends of the first and second sheets at the respective predetermined positions are detected by the first and second sensor means and also that after both sheets have been stopped the second conveyer is operated to drop the second sheet down onto the first sheet on the first conveyer thereby to lay the second sheet on the first sheet in an overlapped relation wherein the leading end of the second sheet is positioned forward of the leading end of the first sheet by a distance substantially corresponding to said predetermined horizontal spaced distance and thereafter the first conveyer is restarted to move the first and second sheets together;

a third conveyer disposed so as to form a conveying path continuing from said first path of the first conveyer for receiving the first and second sheets and moving the two sheets forward at the same speed as the first sheet moved by the first conveyer; and registration stop means having a stop surface extending perpendicularly to said conveying path of the third conveyer and movable between the operative position thereof where said stop surface is placed so as to stop the sheets moved by said third conveyer at their leading ends and the inoperative position thereof where said stop surface is retracted away from said conveying path of the third conveyer, whereby firstly the second sheet is stopped at the leading end thereof by the stop surface and subsequently the first sheet is stopped at the leading end by the stop surface, thus both sheets being registered with the leading ends aligned against the stop surface of the registration stop means.

13. Apparatus of registering two sheets according claim 12, wherein each of said first and second sensor means includes at least two sensors spaced across each of said first and second paths of the first and second conveyers.

14. Apparatus of registering two sheets according claim 12, wherein said control is operable to control the operation of said third conveyer in response to said detection signals from the first and second sensor means so as to stop the third conveyer with a predetermined length of time delay after generation of said detection signals from the first and second sensor means and then to retract the registration stop means to its inoperative position, said time delay being long enough for both sheets to be registered with their leading ends aligned completely against said stop surface of the registration stop means, and thereafter to restart said third conveyer to move the registered sheets away therefrom.

15. Apparatus of registering two sheets according claim 12, further comprising a third sensor means disposed adjacent to said stop surface of the registration stop means for detecting the arrival of the leading end of the second sheet at said stop surface and generating a detection signal in response to detection of such arrival, said control being operable to control the operation of the third conveyer in response to said detection signal from the third sensor means so as to stop the third conveyer with a predetermined length of time delay after generation of said detection signal from the third sensor means and then to retract the registration stop means to its inoperative position, said time delay being long enough for the leading ends of both sheets to be aligned completely against said stop surface of the registration stop means, and thereafter to restart said third conveyer to move the two sheets away therefrom.

16. Apparatus of registering two sheets according claim 12, wherein said third conveyer includes at least one conveying belt which is made of such a material that the coefficient of friction between said conveying belt and the sheet is greater than that between the two sheets.

17. Apparatus of registering two sheets according claim 12, further comprising regulating means for preventing the sheets from being buckled when they are stopped by said stop surface of the registration stop means.

18. Apparatus of registering two sheets according claim 17, wherein said regulating means includes a surface formed on said registration stop means and extending substantially in parallel to said conveying path of the third conveyer when said registration stop means is in its operative position at a spaced distance from said conveying path of the third conveyer that is slightly greater than the combined thickness of two sheets.

19. Apparatus of registering two sheets according claim 17, wherein said regulating means includes a belt extending above said third conveyer and moving in the same direction at substantially the same speed as the sheets moved by said third conveyer and spring means for pressing the sheets via said belt.

20. Method of registering two sheets each having opposite ends comprising: assembling the two sheets by laying one sheet on top of the other sheet in an overlapped relation to each other wherein one end of the upper sheet is positioned outward of one end of the lower sheet;

moving the two sheets with said one ends of thereof as the leading ends along a conveying path by a conveyer in said overlapped relation;

stopping the upper sheet by registration stop means having a stop surface extending on the way of said conveying path in perpendicular relation thereto, thereby to align said leading end of the upper sheet against said stop surface of the registration stop means; and continuing the lower sheet to move by said conveyer and subsequently stopping the lower sheet by said registration stop means thereby to align the leading end of the lower sheet against said stop surface, whereby both sheets are registered with the leading ends thereof aligned against said stop surface of the registration stop means.

21. Method of registering two sheets according to claim 20, wherein said assembling includes laying said one sheet on top of said other sheet in said overlapped relation while moving the two sheets at substantially the same speed along separate feed paths one disposed below the other and extending in a convergent relation to each other toward said conveying path of said conveyer.

22. Method of registering two sheets according to claim 21, wherein said one sheet is moved from a first position in one of said feed paths and said other sheet is moved simultaneously from a second position in the other of said feed paths, said second position being located behind and spaced horizontally from said second position by a predetermined distance.

23. Method of registering two sheets according to claim 20, wherein said assembling includes laying said one sheet on top of said other sheet in said overlapped relation by dropping said one sheet onto said other sheet.

* * * * *